US012251356B2

(12) United States Patent
Allen

(10) Patent No.: US 12,251,356 B2
(45) Date of Patent: Mar. 18, 2025

(54) CANE WITH LINEAR ADJUSTABLE HYDRAULIC SHOCK ABSORBER END

(71) Applicant: Walter D Allen, Binghamton, NY (US)

(72) Inventor: Walter D Allen, Binghamton, NY (US)

( * ) Notice: Subject to any disclaimer, the term of this patent is extended or adjusted under 35 U.S.C. 154(b) by 131 days.

(21) Appl. No.: 18/158,124

(22) Filed: Jan. 23, 2023

(65) Prior Publication Data

US 2024/0245570 A1 Jul. 25, 2024

(51) Int. Cl.
*A45B 9/04* (2006.01)
*A61H 3/02* (2006.01)
*A45B 9/00* (2006.01)

(52) U.S. Cl.
CPC ............. *A61H 3/0277* (2013.01); *A45B 9/04* (2013.01); *A45B 2009/007* (2013.01)

(58) Field of Classification Search
CPC ................................ A61H 3/0277; A45B 9/04
See application file for complete search history.

(56) References Cited

U.S. PATENT DOCUMENTS

| | | | | | |
|---|---|---|---|---|---|
| 1,336,844 | A * | 4/1920 | Klousnitzer | A61H 3/0277 | 135/82 |
| 2,426,594 | A * | 9/1947 | Buell | A61H 3/0277 | 135/83 |
| 3,335,735 | A * | 8/1967 | Colegrove | A61H 3/0288 | 135/69 |
| 4,151,853 | A * | 5/1979 | Inbar | A61H 3/02 | 135/69 |
| 5,628,335 | A * | 5/1997 | Free | A61H 3/02 | 135/69 |
| 7,025,072 | B2 * | 4/2006 | McGrath | A45B 9/00 | 135/82 |
| 8,499,776 | B2 * | 8/2013 | Ban | A45B 3/00 | 135/65 |
| 8,707,975 | B2 * | 4/2014 | Larson | A61H 3/02 | 135/84 |
| 9,254,237 | B2 * | 2/2016 | Basham | A45B 9/04 | |
| 9,516,933 | B2 * | 12/2016 | Woodall | A45B 9/04 | |
| 2007/0089770 | A1 * | 4/2007 | Park | A61H 3/0277 | 135/82 |

* cited by examiner

*Primary Examiner* — Noah Chandler Hawk

(57) ABSTRACT

A novel end assembly for canes and other walking aids having a linear adjustable hydraulic shock absorber threaded into the distal end of the cane and facility for mounting various cane and walking aid ends.

2 Claims, 3 Drawing Sheets

CANE WITH LINEAR ADJUSTABLE HYDRAULIC SHOCK ABSORBER END

FIELD OF DISCLOSURE

The present disclosure relates to walking assisting devices such as canes and crutches.

BACKGROUND

Canes and crutches are used by many people to assist in staying mobile for various reasons such as injury or illness. The regular use of a cane or crutch can cause discomfort or worsen pain from existing conditions such as arthritis.

An improvement to the design commonly used walking aids may give some relieve to the discomfort of their use.

BRIEF OVERVIEW

A cane or other walking aid with a linear adjustable hydraulic shock absorber end may be provided. This Overview intends to explain the basics of the present invention and does not necessarily identify key or essential features of the materials that are being claimed. Further the overview is not intended to limit the scope of the subject matter claimed.

A cane with a linear adjustable hydraulic shock absorber end has a threaded terminal end into which a hydraulic shock absorber is threaded. The inside of the cane tube along with the threaded end form a cavity to receive the shock absorber which is secured by a lock nut.

The hydraulic shock absorber unit is spring loaded so that its normal position is extended. The distal end of the extended shock absorber shaft has an attached mounting barrel to which a plurality of cane ends may be mounted.

The hydraulic shock absorber can be interchanged with a plurality of different shock absorbers having different dampening strengths and strokes depending on the user's needs.

The previous brief overview as well as the descriptions to follow are meant to be used as examples and not intended to be considered restrictive.

BRIEF DESCRIPTION OF THE DRAWINGS

The drawings presented with this disclosure are meant to explain certain embodiments of the present invention in which.

DETAILED DESCRIPTION

The previous description as well as the following detailed descriptions are for the purpose of explanation and example only and should not be considered restrictive. The following is a detailed description of the drawings.

Figure 1:
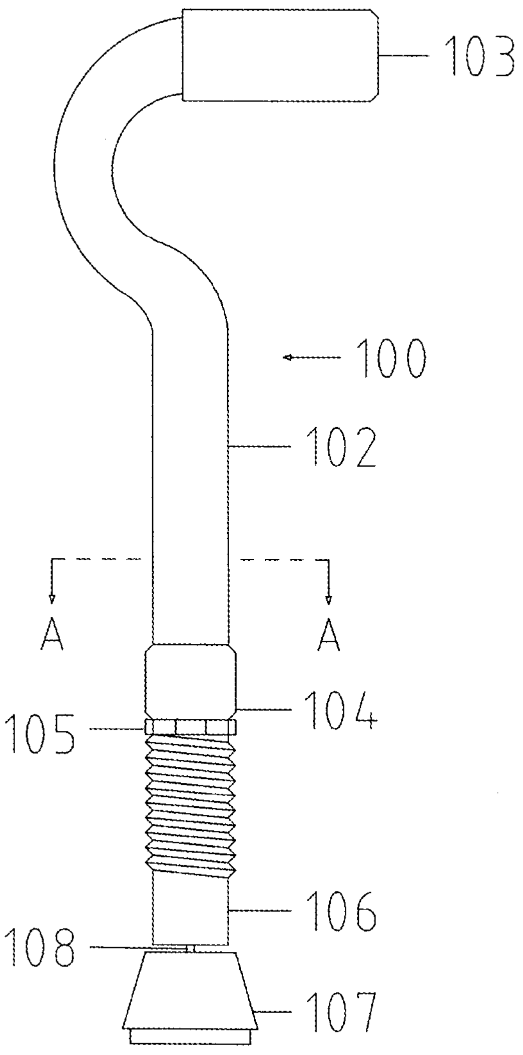
FIG. 1 is an illustration of a walking cane with a linear adjustable hydraulic shock absorber end.

FIG. 1 shows a walking cane 100 with a one piece formed tube 102. The walking cane has a pliable grip 103 friction mounted to tube 102.

The walking cane described previously described is of a common nature and there are many other styles of walking canes and walking assisting devices which are in general use. The novelty of the cane depicted in FIG. 1 is the linear adjustable hydraulic shock absorber end assembly at the distal end of tube 102. The cane type described in this illustration is only one type in use and the illustration is not meant to limit the possible applications of the linear adjustable hydraulic shock absorber end. The linear adjustable hydraulic shock absorber end assembly may be used in a plurality of other walking aid devices such as crutches and other walking aids.

The walking cane 100 may have a threaded receiver 104 attached to the cane body 102. The threaded receiver may be welded or attached by rivets or screws.

The threaded receiver 104 may have hydraulic shock absorber 106 threaded into it which may be adjusted to fine tune the overall length of cane 102. The hydraulic shock absorber 106 may be securely locked in place by lock nut 105. The threaded hydraulic shock absorber 106 illustrated is of a commonly available nature. The novelty of the present invention is in the employment and mounting of the hydraulic shock absorber in a cane or walking aid end assembly.

The hydraulic shock absorber may have a shaft 108 which is normally in the extended position onto which it may have a mounting barrel 113 attached to facilitate the mounting of a plurality of walking aid ends such as tip 107.

Figure 2:
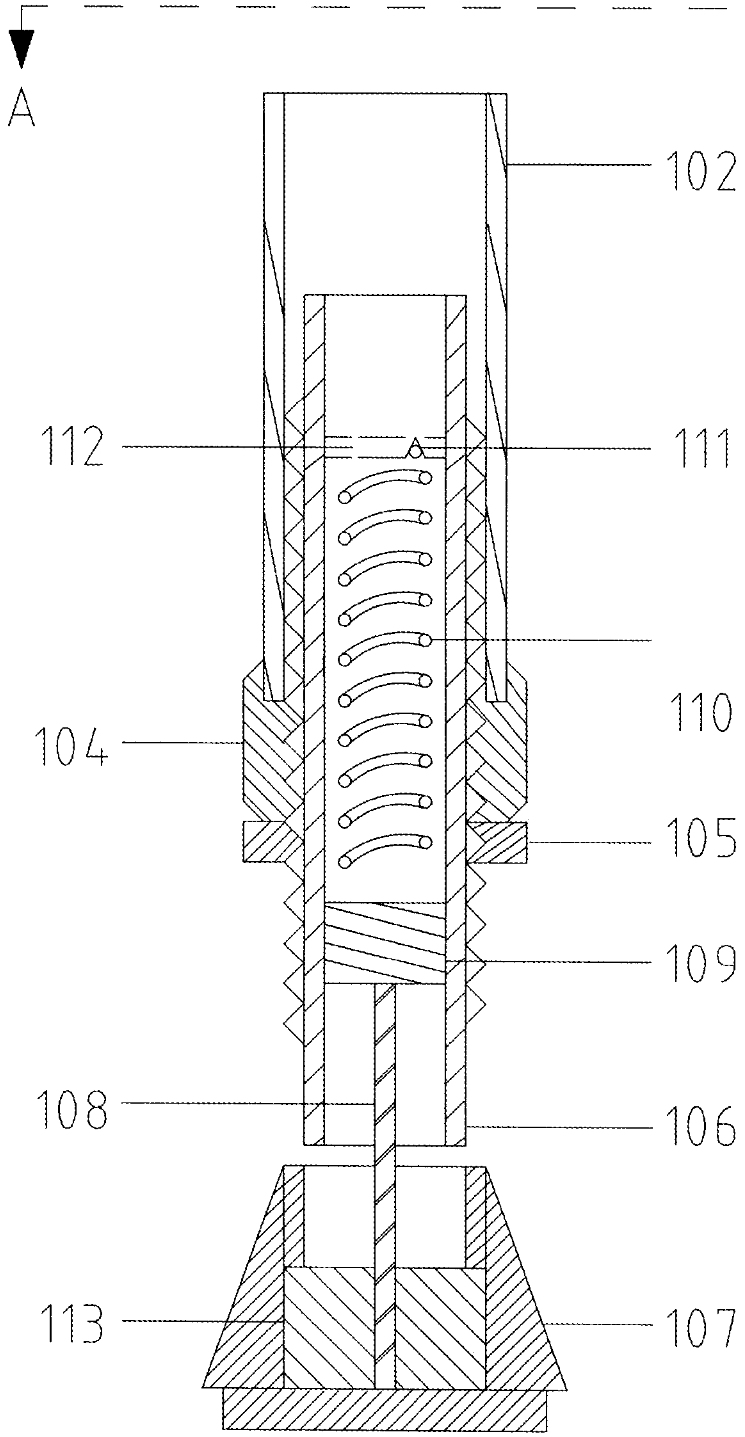
FIG. 2 is a partial cross-sectioned view of FIG. 1 along line A-A. This view illustrates the internal mechanism of the hydraulic shock absorber as well as the mounting within the cane tube.

FIG. 2 shows a cross-sectional view of the linear adjustable hydraulic shock absorber end assembly of cane 102 along line A-A. The hydraulic shock absorber 106 may have a return spring 110 that positions the shaft 108 to a normally fully extended position by forcing piston 109 toward the distal end of the hydraulic shock absorber 106. The hydraulic shock absorber may have a check valve 111 and metering orifice 112 to control the speed and force of dampening.

Figure 3:
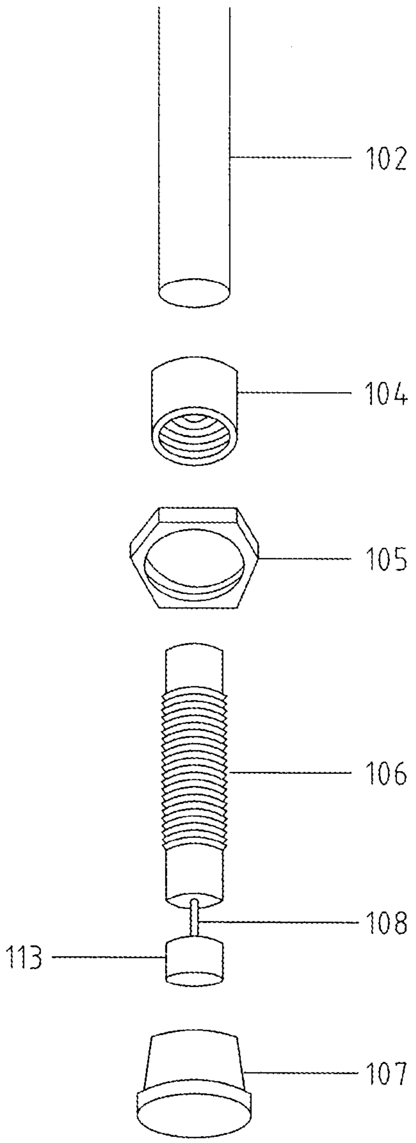
FIG. 3 is a partial exploded perspective view of the cane in FIG. 1 illustrates the individual parts that make up the linear adjustable hydraulic shock absorber end assembly.

FIG. 3 shows an exploded view of cane 102. The threaded receiver 104 may be attached to cane tube 102 by welding, screws or rivets. The hydraulic shock absorber may have a body with a threaded outer surface. The hydraulic shock absorber 106 may be threaded into threaded receiver 104 and secured by lock nut 105. The hydraulic shock absorber position may be fine-tuned for customizing the overall length of a cane or walking aid to the needs of the user. The mounting barrel 113 may have a common rubber cane tip 107 friction mounted onto it.

The linear adjustable hydraulic shock absorber dampens the shock experienced by a cane or walking aid user as the cane or walking aid impacts the walking surface. The hydraulic shock absorber 106 is in a normally extended position caused by spring 110. As the user extends the cane walking aid and it impacts the walking surface the cane or walking aid tip 107 makes contact with the walking surface and causes the mounting barrel 113 to apply force the piston rod 108 causing the piston 109 to move toward the compressed position pressurizing the fluid in hydraulic shock absorber 106 which is metered by orifice 112. When the user lifts the cane or walking aid the spring 110 forces the piston 109 to return to the normally extended position.

As discussed above the metering of hydraulic fluid in hydraulic shock absorber 106 dampens the shock experienced by the cane or walking aid user. The dampening of the impact shock is designed to improve the comfort of the cane or walking aid user. Another aspect of the use of hydraulic shock absorber 106 is that the cane or walking tip end has made contact with the walking surface the cane or walking aid may be turned 360 degrees with little or no friction without being disengaged from the walking surface.

The liner adjustable hydraulic shock absorber end walking cane embodiment illustrated shows the hydraulic cylinder 108 which has a mounting barrel attached to the distal end having a diameter such that it will fit into the removable walking aid rubber end 107. This creates a natural cover to protect the hydraulic shock absorber shaft 108 from dirt and the elements. The removable walking aid end 107 can be easily removed by the user to clean the shaft 108 as well. There may be other embodiments that require weather protective covering which may be accomplished by adding a common accordion type cover that may be secured by common tie-wraps or other straps.

The invention claimed is:

1. A cane with a linear adjustable hydraulic shock absorber end comprising:

a walking aid with a tube having a distal end, the inner surface of the tube being threaded;

a hydraulic shock absorber having a body with a threaded outer surface and a shaft extending outward from the body, the body being threaded into the end of the tube so that a portion of the threaded outer surface of the body remains exposed;

a nut threaded onto the exposed outer surface of the body and abutting the end of the tube to lock the hydraulic shock absorber in place; and a barrel attached to a distal end of the shock absorber shaft, the barrel being configured to mount one of a plurality of walking aid ends.

2. A cane with a linear adjustable hydraulic shock absorber end comprising:

a walking aid with a tube having a distal end, a threaded receiver attached to the distal end, the inner surface of the receiver being threaded;

a hydraulic shock absorber having a body with a threaded outer surface and a shaft extending outward from the body, the body being threaded into the receiver at the end of the tube so that a portion of the threaded outer surface remains exposed;

a nut threaded onto the exposed outer surface of the body and abutting the receiver to lock the hydraulic shock absorber in place; and a barrel attached to a distal end of the shock absorber shaft, the barrel being configured to mount one of a plurality of walking aid ends.

* * * * *